(12) United States Patent
Naik et al.

(10) Patent No.: US 9,323,960 B2
(45) Date of Patent: Apr. 26, 2016

(54) CLONE-PROOF MONETARY AND SECURITY DOCUMENTS AND PREPARATION THEREOF

(76) Inventors: Praful Ramachandra Naik, Uttara Kanada (IN); Subodh Yeshawant Pande, Pune (IN); Winston Tan Cheng Lock, Singapore (SG); Rahul Gopikishan Bharadia, Pune (IN); Moran Peter Malcolm, Massagno (CH); Narayan Nambudiri, Singapore (SG)

(*) Notice: Subject to any disclaimer, the term of this patent is extended or adjusted under 35 U.S.C. 154(b) by 103 days.

(21) Appl. No.: 14/117,362

(22) PCT Filed: May 8, 2012

(86) PCT No.: PCT/IN2012/000336
§ 371 (c)(1),
(2), (4) Date: Nov. 12, 2013

(87) PCT Pub. No.: WO2012/160571
PCT Pub. Date: Nov. 29, 2012

(65) Prior Publication Data
US 2015/0129655 A1    May 14, 2015

(30) Foreign Application Priority Data
May 9, 2011  (IN) .......................... 1431/MUM/2011

(51) Int. Cl.
*G06F 17/00* (2006.01)
*G06K 1/12* (2006.01)
(Continued)

(52) U.S. Cl.
CPC .............. *G06K 1/121* (2013.01); *G06K 19/086* (2013.01); *G06K 19/12* (2013.01); *G06K 19/14* (2013.01); *G06K 19/18* (2013.01)

(58) Field of Classification Search
CPC ....... G06K 19/12; G06K 19/14; G06K 19/18; G06K 1/121
USPC .................................................. 235/375, 493
See application file for complete search history.

(56) References Cited

U.S. PATENT DOCUMENTS

| 5,388,158 A | 2/1995 | Berson |
| 5,974,150 A | 10/1999 | Kaish et al. |

(Continued)

FOREIGN PATENT DOCUMENTS

| EP | 0889448 | 1/1999 |
| JP | 7-47792 | 2/1995 |

(Continued)

OTHER PUBLICATIONS

Singapore Search Report and Written Opinion issued Jan. 4, 2016 in corresponding Singapore Patent Application No. 2013083423 (12 pages).

(Continued)

*Primary Examiner* — Seung Lee
(74) *Attorney, Agent, or Firm* — Pillsbury Winthrop Shaw Pittman LLP

(57) ABSTRACT

The present invention relates to particulate based compositions for deposition on substrates, a system and method for the deposition of the said compositions for preparation of a clone-proof monetary and/or security documents. The said composition is applied as an identifier at predetermined location on the substrate. The magneto-optical signal from the said applied composition is captured by the reading system. Further it is encrypted same as an invisible or visible two dimensional (2D) barcode/image on the substrate as an associated identifier so as to create a dedicated, non repeatable and unique functional digitized relation between two said identifiers and/or any other identifier(s) linked to a specific object.

30 Claims, 17 Drawing Sheets

Schematic of the Process

(51) Int. Cl.
*G06K 19/08* (2006.01)
*G06K 19/12* (2006.01)
*G06K 19/14* (2006.01)
*G06K 19/18* (2006.01)

(56) References Cited

U.S. PATENT DOCUMENTS

| | | | |
|---|---|---|---|
| 6,904,525 B1 | 6/2005 | Berson et al. | |
| 7,533,062 B2 * | 5/2009 | Sanchez | G06K 9/00 283/73 |
| 8,276,511 B2 * | 10/2012 | Raksha | B05D 3/207 101/375 |
| 8,763,903 B2 | 7/2014 | Moran et al. | |
| 2007/0194103 A1 * | 8/2007 | Manheim | G06Q 20/042 235/379 |

FOREIGN PATENT DOCUMENTS

| | | |
|---|---|---|
| JP | 8-99484 | 4/1996 |
| JP | 2001-518414 | 10/2001 |
| JP | 2006-168086 | 6/2006 |
| JP | 2011-512595 | 4/2011 |
| WO | WO 96/37870 | 11/1996 |

OTHER PUBLICATIONS

Japanese Office Action mailed Feb. 2, 2016 in corresponding Japanese Patent Application No. 2014-509891 (8 pages).

* cited by examiner

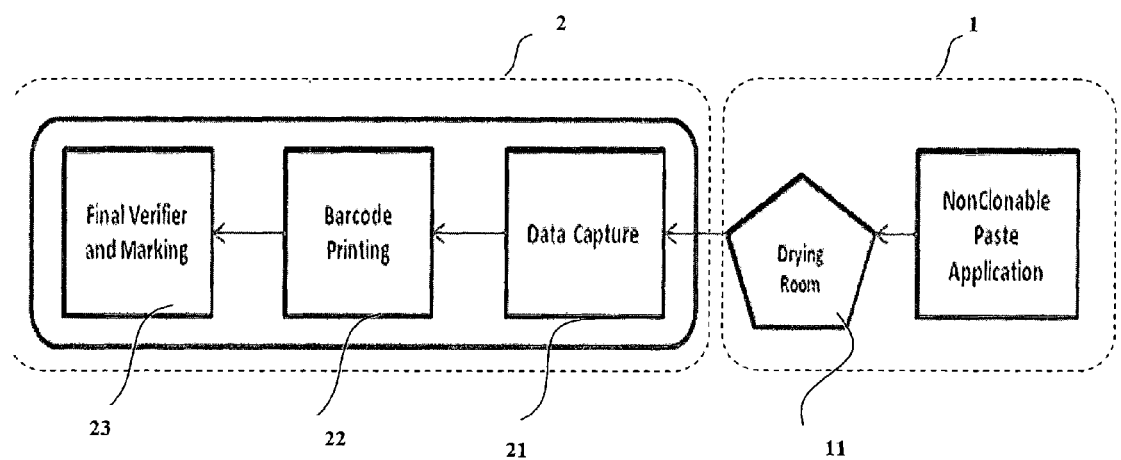
Fig. 1 Schematic of the Process

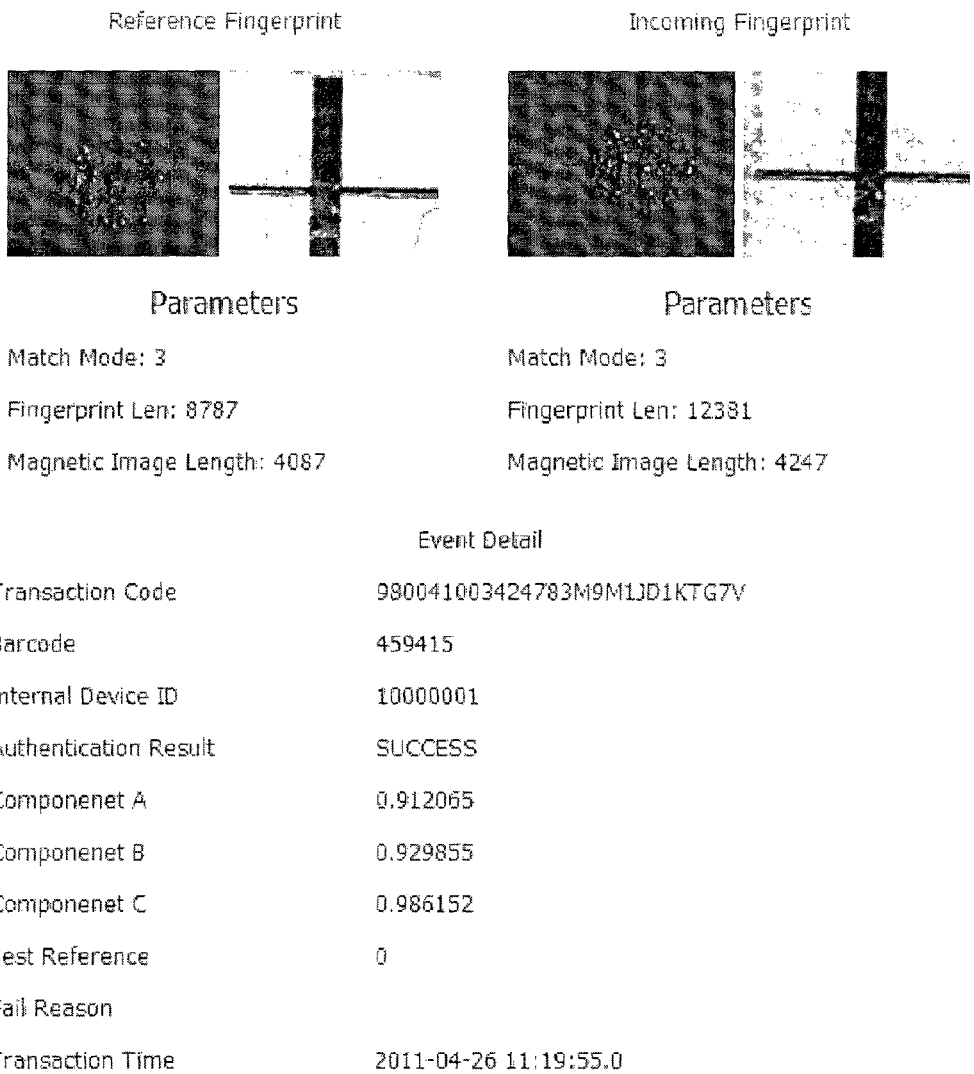
Fig 2.1 a: - Measure of affixation by rub resistance test for sample no. 1 from 1st set of Samples Reference Fingerprint              Incoming Fingerprint

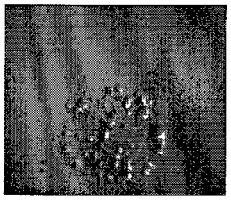 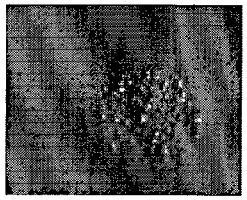

Parameters                               Parameters

Match Mode: 3                             Match Mode: 3

Fingerprint Len: 8926                 Fingerprint Len: 10871

Magnetic Image Length: 4154        Magnetic Image Length: 4195

Event Detail

| | |
|---|---|
| Transaction Code | 98004100342478388L1JD1KVZQ5 |
| Barcode | 459416 |
| Internal Device ID | 10000001 |
| Authentication Result | SUCCESS |
| Componenet A | 0.941055 |
| Componenet B | 0.856045 |
| Componenet C | 0.987613 |
| Best Reference | 0 |
| Fail Reason | |
| Transaction Time | 2011-04-26 11:20:13.0 |

Fig 2.1 b: - Measure of affixation by rub resistance test for sample no. 2 from 1st set of Samples Reference Fingerprint                    Incoming Fingerprint Parameters                               Parameters Match Mode: 3                            Match Mode: 3

Fingerprint Len: 8726                    Fingerprint Len: 11452

Magnetic Image Length: 4030              Magnetic Image Length: 3800

Event Detail

| | |
|---|---|
| Transaction Code | 980041003424783RB21JBLLCVXK |
| Barcode | 459414 |
| Internal Device ID | 10000001 |
| Authentication Result | SUCCESS |
| Componenet A | 0.939139 |
| Componenet B | 0.959456 |
| Componenet C | 0.982086 |
| Best Reference | 0 |
| Fail Reason | |
| Transaction Time | 2011-04-11 13:36:41.0 |

Fig 2.2: - Laundry test result for sample from 1st set of Samples

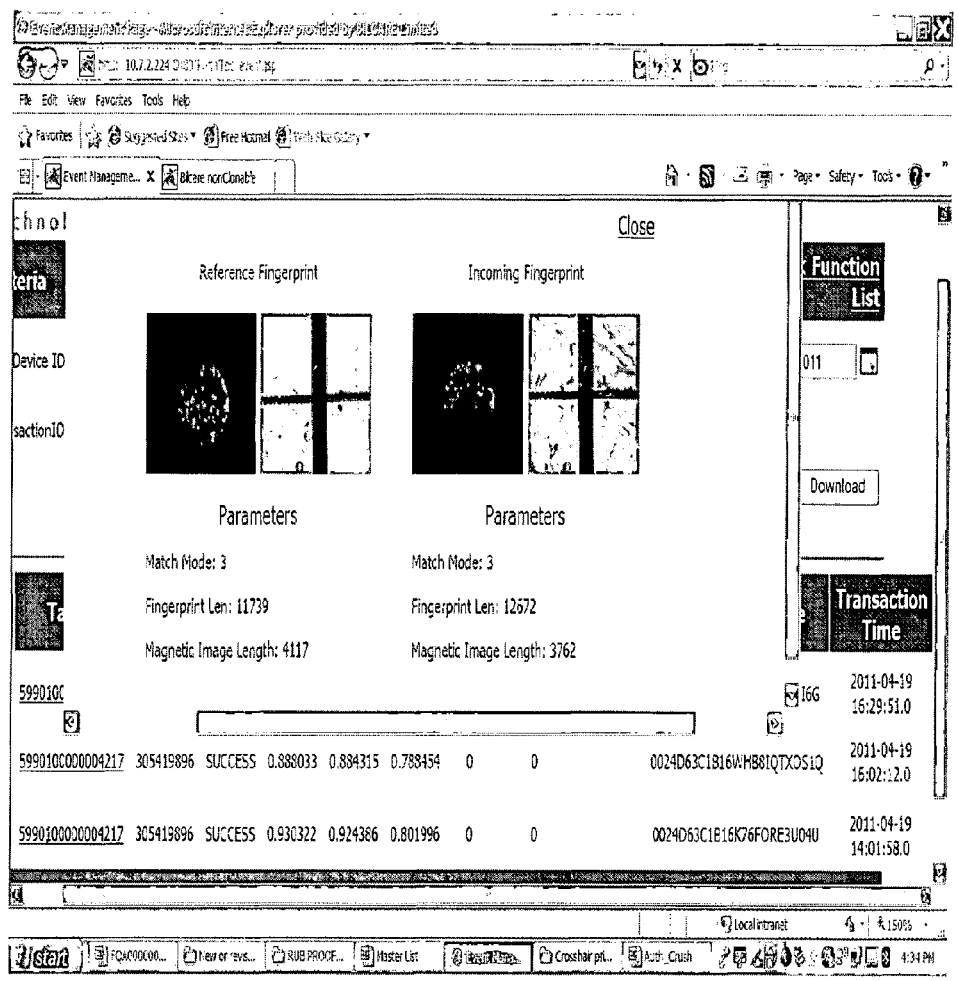
Fig 2.3 - Dry Crumpling test result for sample from 1st set of Samples Reference Fingerprint          Incoming Fingerprint Parameters                 Parameters Match Mode: 3                    Match Mode: 3

Fingerprint Len: 13216          Fingerprint Len: 15050

Magnetic Image Length: 4192     Magnetic Image Length: 4180

Event Detail

| | |
|---|---|
| Transaction Code | 98004100342478340V1JBLLRMKH |
| Barcode | 459426 |
| Internal Device ID | 10000001 |
| Authentication Result | SUCCESS |
| Componenet A | 0.896604 |
| Componenet B | 0.954265 |
| Componenet C | 0.975985 |
| Best Reference | 0 |
| Fail Reason | |
| Transaction Time | 2011-04-11 13:42:32.0 |

Fig 2.4: - Wet Crumpling test result for sample from 1st set of Samples

Reference Fingerprint                    Incoming Fingerprint

Parameters                               Parameters

Match Mode: 3                            Match Mode: 3

Fingerprint Len: 9226                    Fingerprint Len: 11815

Magnetic Image Length: 4217              Magnetic Image Length: 4118

Event Detail

| | |
|---|---|
| Transaction Code | 980041003424783BH11JBLLPXK2 |
| Barcode | 459424 |
| Internal Device ID | 10000001 |
| Authentication Result | SUCCESS |
| Componenet A | 0.582671 |
| Componenet B | 0.750258 |
| Componenet C | 0.882502 |
| Best Reference | 0 |
| Fail Reason | |
| Transaction Time | 2011-04-11 13:41:41.0 |

Fig 2.5: - Accelerated ageing test result for sample from 1st set of Samples

Reference Fingerprint          Incoming Fingerprint

Parameters                     Parameters

Match Mode: 3                  Match Mode: 3

Fingerprint Len: 9774          Fingerprint Len: 13387

Magnetic Image Length: 3870    Magnetic Image Length: 4038

Event Detail

| | |
|---|---|
| Transaction Code | 980041003424783C141J8LLTTWZ |
| Barcode | 459428 |
| Internal Device ID | 10000001 |
| Authentication Result | SUCCESS |
| Componenet A | 0.742053 |
| Componenet B | 0.748009 |
| Componenet C | 0.941665 |
| Best Reference | 0 |
| Fail Reason | |
| Transaction Time | 2011-04-11 13:43:37.0 |

Fig 3.1 a: - Measure of affixation by rub resistance test for sample no. 1 from 2$^{nd}$ set of Samples

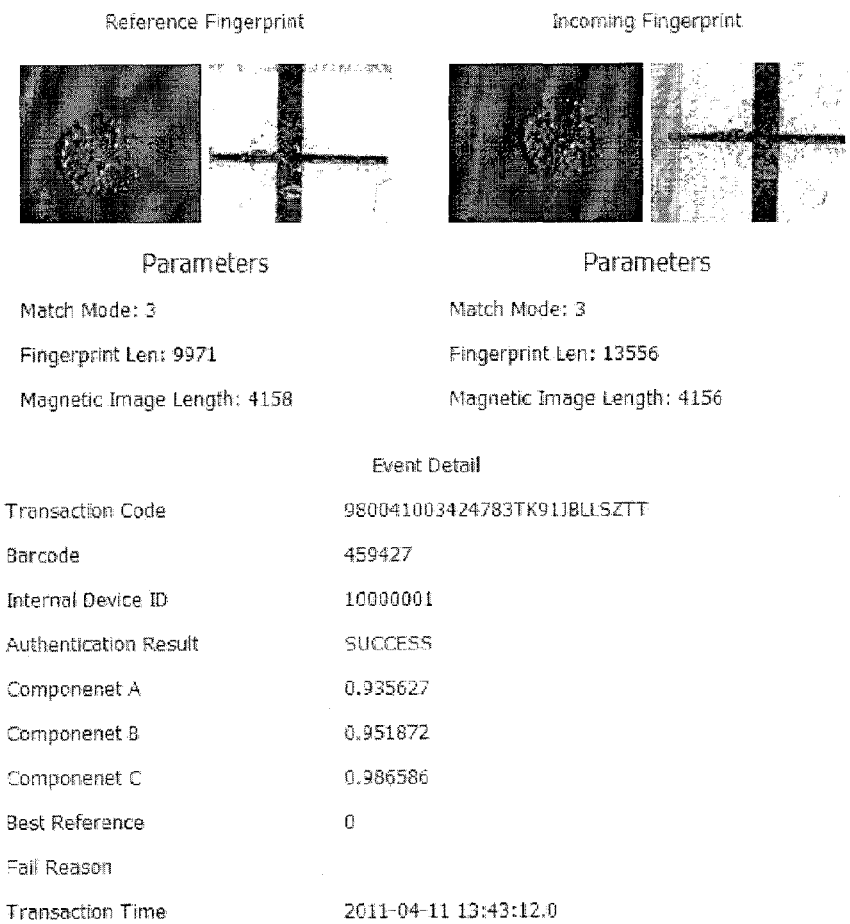
Fig 3.1 b: - Measure of affixation by rub resistance test for sample no. 2 from 2<sup>nd</sup> set of Samples Reference Fingerprint         Incoming Fingerprint

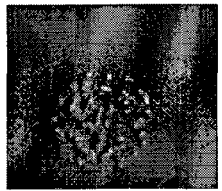   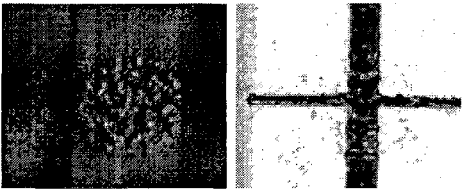

Parameters                     Parameters

Match Mode: 3                  Match Mode: 3

Fingerprint Len: 9596          Fingerprint Len: 13776

Magnetic Image Length: 4144    Magnetic Image Length: 4318

Event Detail

| | |
|---|---|
| Transaction Code | 980041003424783ZHX1JBLLP469 |
| Barcode | 459422 |
| Internal Device ID | 10000001 |
| Authentication Result | SUCCESS |
| Componenet A | 0.932198 |
| Componenet B | 0.901873 |
| Componenet C | 0.981511 |
| Best Reference | 0 |
| Fail Reason | |
| Transaction Time | 2011-04-11 13:41:17.0 |

Fig 3.2: - Laundry test result for sample from 2nd set of Samples

Reference Fingerprint                          Incoming Fingerprint

Parameters                                     Parameters

Match Mode: 3                                  Match Mode: 3

Fingerprint Len: 9167                          Fingerprint Len: 12808

Magnetic Image Length: 3956                    Magnetic Image Length: 4123

Event Detail

| | |
|---|---|
| Transaction Code | 980041003424783T671JBLLLCWV |
| Barcode | 459419 |
| Internal Device ID | 10000001 |
| Authentication Result | SUCCESS |
| Componenet A | 0.909548 |
| Componenet B | 0.862271 |
| Componenet C | 0.981072 |
| Best Reference | 0 |
| Fail Reason | |
| Transaction Time | 2011-04-11 13:39:55.0 |

Fig 3.3: - Dry Crumpling test result for sample from 2$^{nd}$ set of Samples

Reference Fingerprint 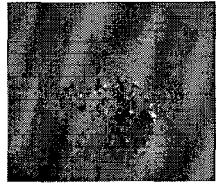

Incoming Fingerprint 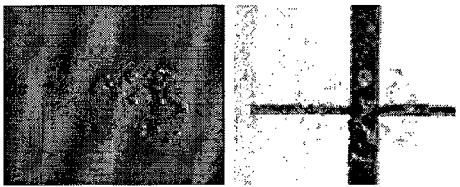

Parameters

Match Mode: 3

Fingerprint Len: 8985

Magnetic Image Length: 3762

Parameters

Match Mode: 3

Fingerprint Len: 12633

Magnetic Image Length: 3864

Event Detail

| | |
|---|---|
| Transaction Code | 980041003424783WFM1JBLLH8DY |
| Barcode | 459418 |
| Internal Device ID | 10000001 |
| Authentication Result | SUCCESS |
| Componenet A | 0.926051 |
| Componenet B | 0.915071 |
| Componenet C | 0.982852 |
| Best Reference | 0 |
| Fail Reason | |
| Transaction Time | 2011-04-11 13:38:23.0 |

Fig 3.4: - Wet Crumpling test result for sample from 2$^{nd}$ set of Samples

Reference Fingerprint  Incoming Fingerprint

Parameters  Parameters

Match Mode: 3  Match Mode: 3

Fingerprint Len: 10445  Fingerprint Len: 13385

Magnetic Image Length: 3935  Magnetic Image Length: 3961

Event Detail

| | |
|---|---|
| Transaction Code | 980041003424783R201JBLLQPQB |
| Barcode | 459425 |
| Internal Device ID | 10000001 |
| Authentication Result | SUCCESS |
| Componenet A | 0.922898 |
| Componenet B | 0.906247 |
| Componenet C | 0.980665 |
| Best Reference | 0 |
| Fail Reason | |
| Transaction Time | 2011-04-11 13:42:04.0 |

Fig 3.5: - Accelerated ageing test result for sample from 2$^{nd}$ set of Samples

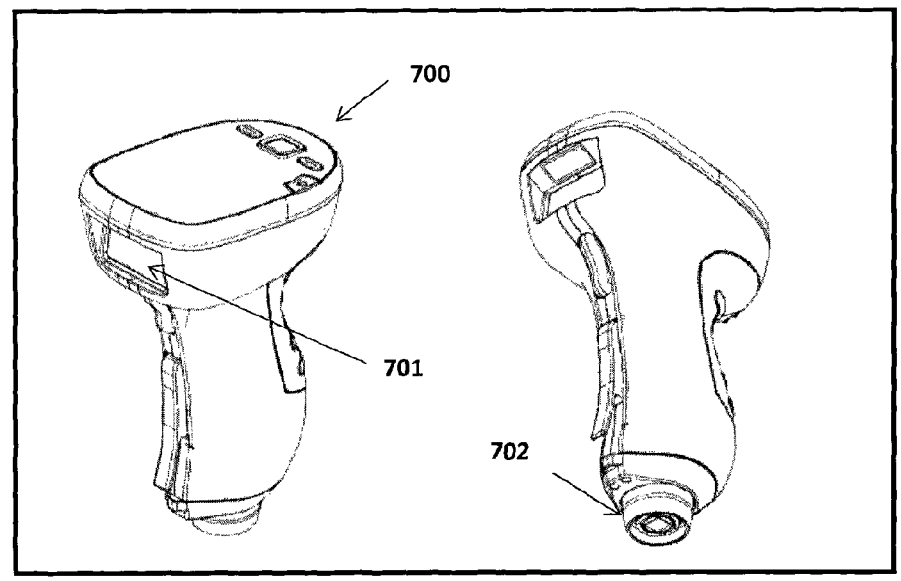
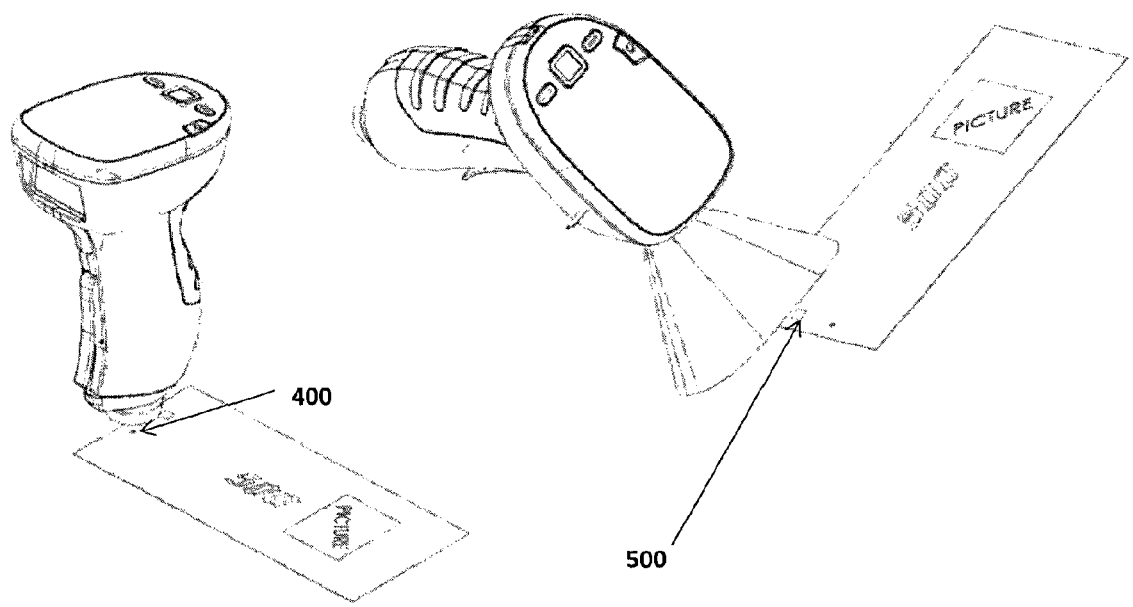
Figure 7

CLONE-PROOF MONETARY AND SECURITY DOCUMENTS AND PREPARATION THEREOF

CROSS REFERENCE TO RELATED APPLICATIONS

This application is a U.S. National Stage of International Application No. PCT/IN2012/000336 filed May 8, 2012, which claims the benefit of priority to Indian Application No. 1431/MUM/2011, filed May 9, 2011, the entire contents of which are incorporated herein by reference in its entirety.

FIELD OF INVENTION

The present invention relates to particulate based compositions for deposition on substrates, a system and method for the deposition of the said compositions for preparation of a clone-proof monetary and/or security documents. The invention further relates to a system for application of the said composition as an identifier at predetermined location on the substrate, capturing magnetic/magneto-optical signal from the said applied composition on the said substrate, digitizing, storing, embedding and encrypting the same as an invisible or visible two dimensional (2D) barcode on the substrate as an associated identifier so as to create a dedicated, non repeatable and unique functional digitised relation between two said identifiers and/or any other identifier(s) linked to a specific object.

BACKGROUND OF THE INVENTION

A process of identification and authentication of an object is necessarily based on dedicated identifier information or set of identifiers associated with the said object. The process of authentication generally involves the capturing of identifier information and validating it with a database of stored identifier information corresponding to the said object. The identifiers are either introduced in the substrate during the manufacture of the substrate or may be introduced onto the substrate (e.g. Paper, woven paper, woven cloth, plastic films, cotton pulp based substrates etc.) after the manufacture of the substrate which is predominantly the case in the case of financial documents, currency, mark lists, certificates etc.

The challenge lies in providing a system for applying the identifier on predetermined locations of the preformed substrate on an industrial scale simultaneously ensuring the precision with which that identifier is applied on the predetermined location of said substrate. Further the challenge lies in robustly applying the identifier on the said substrate such that it survives the onslaughts of long term repeated handling of the substrate and exposure to repeated adverse factors like crumpling, rubbing, wetting etc. Further the challenge lies in effectively digitally capturing the identifier representation, creating databases and effectively utilising them for the identification and authentication of an object comprising of the said substrate.

SUMMARY OF THE INVENTION

The main object of the invention is to provide particulate based compositions for deposition on preformed substrates, a system and method for the deposition of the said compositions on the said substrates.

Another object of the invention is to provide method of preparation of the said particulate based composition.

Another object Of the invention is to provide a system for deposition of the said compositions as an identifier at a predetermined location(s) on a substrate, digitally capturing the representation of the composition as deposited on the said substrate and storing the same in an encrypted format.

Another object of the invention is to provide a system for depositing the said composition an identifier at predetermined location on the substrate, capturing magnetic/magneto-optical signal from the said applied composition on the said substrate, digitizing, storing, embedding and encrypting the same as an invisible or visible 2d barcode on the substrate as an associated identifier so as to create a dedicated, non repeatable and unique functional digitised relation between two said identifiers and any other identifier(s) linked to a specific object.

Another object of the invention is to provide compositions comprising particles of at least one metal and for metal oxides of particle sizes ranging from 100 nm to 100 microns.

Another object of the invention is to provide a system for the application of the said compositions at predetermined locations on preformed substrates in roll and/or sheet form moving at substantial speed.

Yet another object of the invention is to deposit the compositions on a substrate selected from plastic, paper, woven fibre, non-woven fibre structure.

Yet another object of the invention is to provide a system to deposit the compositions on a substrate that is in motion at a speed ranging from 0.6 meter/sec to 5 meters/sec.

Yet another object of the invention is deposit the said compositions on a substrate so that it is robustly adheres to the substrate in a manner to survive long term handling of the object comprising of the said substrate containing the applied composition.

Yet another object of the invention is to create an identifier on the substrate for precise location and detection of the composition deposited on the substrate. The creation of this identifier is accomplished either before or after deposition of the composition on the substrate.

Yet another object of the invention is to ensure formation of protective layer over the deposit of the applied composition.

Yet another object of the invention is to deposit the said compositions on the substrate so as to avoid undesirable localized agglomeration/aggregate formation.

Yet another object of the invention is to provide a ductile composite on the substrate to impart crumpling resistance.

Yet another object of the invention is to provide scuff and wash resistant compositions for application on the said preformed substrates.

Another object of the invention is to provide a system and method to create protective overlay on the identifier to prevent it from any damage due to abrasion mechanical working, etc during long term usage.

Yet another object of the invention is to magnetize the deposited particles after applying the same vide the said compositions on the said substrate.

It is yet another object of the invention to provide an overlay that functions as a self marking for a reading device reader to locate the region on the substrate where the magnetized particles are located.

Another object of the invention is to provide a system to create digital representation having 3D signal structures (fingerprint) using the signal captured from the magnetized particles deposited on the preformed substrate that acts as a first identifier. Further object of the invention is to embed the said 3D signal structure in an encrypted format into a 2D barcode/ image which then can be printed onto substrate as a second identifier for irrefutably linking the first identifier and second identifier.

Another object of the invention is to provide a system to capture digital representation at substantially high speeds of the order of 100-300 milliseconds per deposition.

Yet another object of the invention is to provide a system for conversion of the digital representation into an encrypted barcode ready for print in time intervals of the order of 100-300 milliseconds per digital representation. Further object of the invention is to print the encrypted barcode/image at time interval of less than 300 milliseconds per barcode/image.

Another object of the invention is to provide the said identifiers on currency notes, financial documents, mark lists, transcripts etc.

Thus in accordance with the invention a clone proof document comprising a substrate provided with a particulate composition as an identifier at a predetermined location,
  barcode and/or image as an associated identifier
  wherein there is a unique functional relation between two said identifiers of the substrate
  wherein
  the system for preparation and functionalization of the said substrate comprises of an applicator means (1) and a data capture system (2)
  wherein the applicator system
  a drying station (11),
  a device to magnetize the composition on the substrate,
  the data capture system (2) comprising a data capture centre (21) comprising first magneto-optic reading system, data-matrix printing station (22) and print verification station (23), a second reading device that is deployed in the field for end-user
  wherein
  the said magneto-optic reading system captures the signal from the said particulate composition identifier of the said substrate and transforms it into a magneto-optical image to assign a signature to the said particulate based composition of the substrate,
  the said signature is then embedded in an encrypted into a barcode/image as an to associated identifier that is printed onto the substrate for irrefutably linking the said signature of the particulate deposit identifier with the associated identifier to create a unique functional relation between the said two identifiers.

BRIEF DESCRIPTION OF DRAWINGS

FIG. 1 shows deposit applicator means 1 and a data capture system 2.

FIG. 2.1a shows measurement of affixation by rub resistance test for sample number 1 from first set of samples.

FIG. 2.1b shows measurement of affixation by rub resistance test for sample number 2 from first set of samples.

FIG. 2.2 shows laundry test results for sample from first set of samples.

FIG. 2.3 shows dry crumpling test result for sample from first set of samples.

FIG. 2.4 shows wet crumpling test result for sample from first set of samples.

FIG. 2.5 shows accelerated ageing test for sample from first set of samples.

FIG. 3.1a shows measurement of affixation by rub resistance test for sample number 1 from second set of samples.

FIG. 3.1b shows measurement of affixation by rub resistance test for sample number 2 from second set of samples.

FIG. 3.2 shows laundry test results for sample from second set of samples.

FIG. 3.3 shows dry crumpling test result for sample from second set of samples.

FIG. 3.4 shows wet crumpling test result for sample from second set of samples.

FIG. 3.5 shows accelerated ageing test for sample from second set of samples.

FIG. 7 shows a barcode scanner 701 to read barcode 500 on the substrate and signature reading means 702 to read the particulate based composition 400 on the substrate.

DETAILED DESCRIPTION OF THE INVENTION

Figure 4:
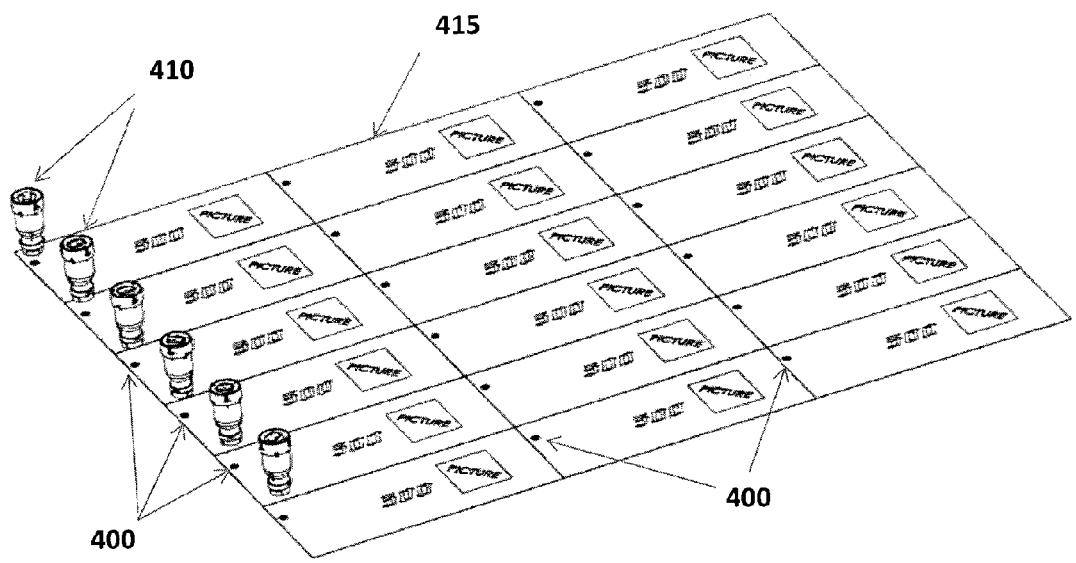
FIG. 4 shows steps of: creating reference coordinate system during printing process of substrate 415.

Features and advantages of this invention will become apparent in the following detailed description and the preferred embodiments with reference to the accompanying drawings.

The system of the present invention as illustrated in FIG. 1 comprises of deposit applicator means 1 and a data capture system 2. The applicator system comprises either of the means such as spot dispensing, flat bed screen printing (screen fixed and squeegee moves), flat bed screen printing (screen moves and squeegee fixed), rotary screen printing for application/deposition of the composition on the substrate. The drying station 11 comprises a means for curing of the deposited paste either by heat curing or by UV curing depending on the constituents of the medium of the particulate composition. Further there is a means (not shown) in the system 1 to magnetize the applied/deposited composition on the substrate. A signature is associated to particulate based compositions applied on a substrate by capturing magnetic field strength signals from the said substrate and transforming it into a magneto-optical image. The data capture system 2 comprises of data capture centre 21 comprising first magneto-optic reading system, data-matrix printing station 22 and print verification station 23. The second mangneto-optic system (not shown) is deployed in the field for the user.

Figure 5:
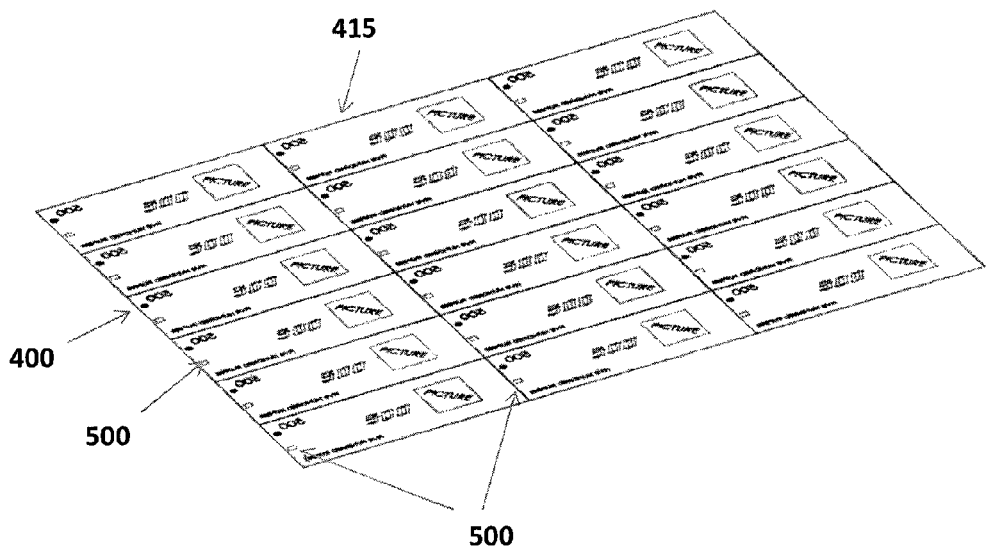
FIG. 5 shows compressing and encoding the said partial reference signature into a barcode 500 that is printed on the substrate 415.

The said process of assigning signature to the particulate based composition is carried out during printing process. FIG. 4 and FIG. 5 depict details. It comprises steps of:
  creating reference coordinate system during printing process of substrate 415 (FIG. 4) (such as currency) by printing fiducial marks on top of the applied particulate based composition identifier 400 so that an origin and orientation can be determined from the fiducial marks;
  Fiducial marks include but are not limited to: a cross-hair, square, rectangular, circular or linear marks, or any combination of the above;
  Capturing magneto-optical image from the particulate based composition 400 with the aid of the sensing means 410 the said data capture system 2;
  Dividing the said image into multiple regions using the fiducial marks as a coordinate system;
  Checking the said regions for magnetic field strength variation for explicit signature creation;

Storing magneto-optical image in the said data capture system 2 database as its full reference signature for particular substrate such as currency;

Creating a partial magneto-optical reference signature;

Encryption of the said partial reference signature using AES 128 for symmetric key encryption, or by using a public/private key pair if asymmetric encryption is preferable;

Compressing and encoding the said partial reference signature into a barcode 500 (FIG. 5) that is printed on the substrate 415

By reconstructing the partial reference signature from the barcode 500 printed on the substrate 415 and matching against a newly acquired magneto-optical signature, a reading system associated with the present invention can determine whether the two match or correlate without using the full reference signature stored in the system database;

Reading the particulate based composition using the said first magneto optic reading system and the barcode after printing for verification purposes using a reading system of the print verification station 23 so as to match the newly captured partial signature (by the reading system) against the partial reference signature reconstructed from the barcode during the substrate printing process;

The said first magneto optic reading system operates to capture and develop a digital representation (at the rate of 100 to 300 millisecond per deposit) having complex 3D signal structures; the said digital representations being stored in the data server of the system; the representation then being embedded in an encrypted format into a 2D barcode/image (100-300 milliseconds per digital representation) and the said barcode/image being printed onto substrate for irrefutably linking both the particle deposit and its digital representation embedded onto the substrate.

Figure 6A:
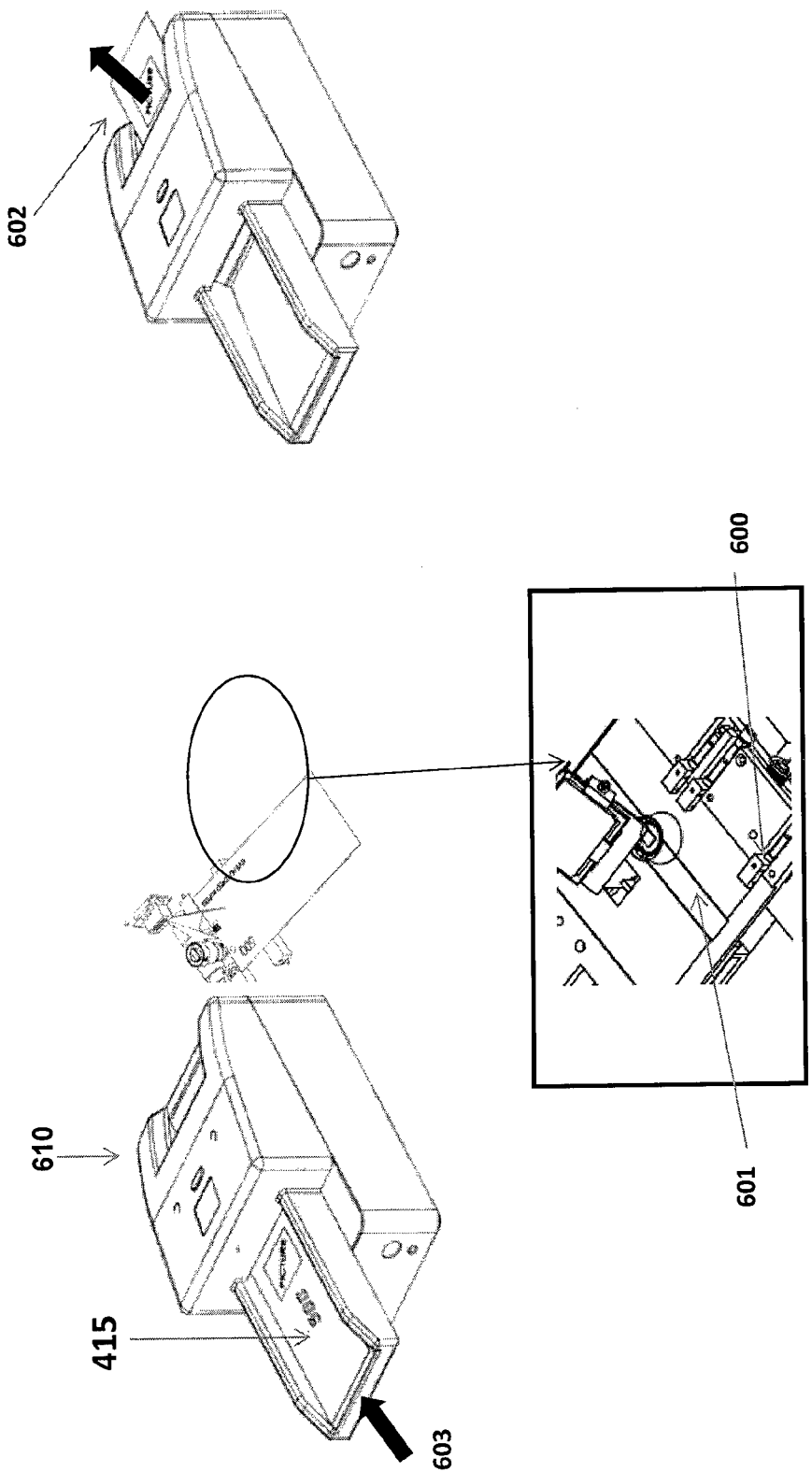
FIG. 6a shows a system 610 is used to first retain the substrate 415 such as currency which requires retrieval of the full signature from the database to determine its authenticity.

Embodiments of the first and second reading system are depicted in FIG. 6 and FIG. 7. The said reading system reads, decodes and correlates partial magneto-optical reference signatures which are encoded in a barcode printed on the substrate itself. Matching with the partial reference signature is first carried out, and matching with the full reference signature is only required if the system cannot reliably determine authenticity from the partial reference signature.

The reading system operates in steps of:

decoding of the barcode printed on the substrate 415 (such as currency);

reconstructing partial reference signature from the said decoded barcode;

detecting the said fiducial marks on the particulate based composition 400 and capturing a new magneto-optical signature from said particulate based composition;

extracting another partial signature from the newly acquired signature by using the selected region information encoded in the barcode;

matching the partial reference signature reconstructed from the barcode and the partial signature extracted from the newly acquired signature;

decision of authenticity based on the extent of the said matching;

optionally if the two partial signatures match cannot be reliably determined, retrieving the full reference signature from the database using the substrate serial number or other identifying information, and then matching the full reference signature from the database against the newly acquired full signature to determine whether the substrate is authenticated or fails.

Figure 6B:
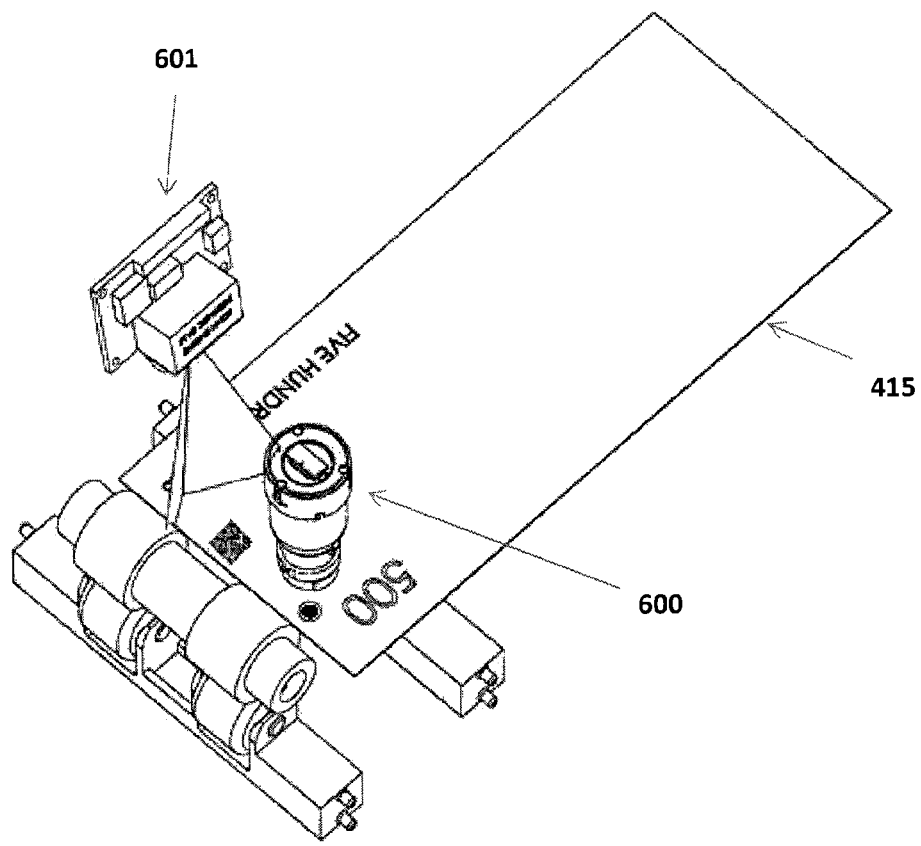
FIG. 6b shows the system having a 2D barcode scanner 601 and signature reading means 600.

In an embodiment of the present invention as depicted in FIG. 6, a system 610 is used to first retain the substrate 415 such as currency which requires retrieval of the full signature from the database to determine its authenticity. As depicted in FIG. 6(b), the system comprises of 2D barcode scanner 601 and signature reading means 600. By placing such currency first in a holding apparatus through the input 603, the reading the reading system can continue to process subsequent currency in parallel, and not be slowed down by retrieval of the full signature from the database.

Another embodiment of the present invention as depicted in FIG. 7. It comprises of a barcode scanner 701 to read barcode 500 on the substrate and signature reading means 702 to read the particulate based composition 400 on the substrate. It reads the particulate based composition and the barcode of one substrate such as currency note at a time manually. Such a reading system may be in the form of a table-top machine or a handheld reader suitable for establishments or individuals.

The said particulate based composition 400 comprises of magnetizable metal and/or metal oxide particles, alkyd resins and water based acrylic emulsion. Alternatively the composition comprises metal/metal oxide particles and UV curable ink.

The selected water based acrylic emulsion and the UV cured ink contain appropriate binders, viscosity modifiers and stabilizers, drying agents to ensure rapid drying and speedy surface skin formation after the composition is pressured deposited onto the substrate.

The composition preferably in the form of paste with apparent viscosity in the range of 2 to 10 Pas, the solid content is in the range of 50-90% is pressured deposited onto the substrate.

In one of the embodiments the said composition is prepared in steps of:

Soaking metal particles/metal oxide (20 to 80% by weight) in Enamel (10%-50% by weight) to impart the rust proof features, wherein the alkyd resin has specific gravity 1-2.0 preferably 1.0-1.11, adding (10 to 70% by weight) acrylic emulsion and mixing in a planetary mixer to form a paste wherein the acrylic emulsion has specific gravity of 1.2-2.0 preferably 1.38-1.42, When this composition is deposited on the substrate, heat curing of the deposited the deposited paste is carried out at 50-200° C. as the substrate (sheet/roll) moves at 0.6 meter/sec to 5 meter/sec.

Enamels include but not restricted to solvent based Alkyd resins, epoxy, polyurethane, acrylics etc.

Alkyds include but not restricted to soyabean oil modified alkyds, long oil modified alkyds with the number average molecular weights of 2000 to 10000. Some of the ready to use alkyd paints are supplied by reputed brands in paint industries as Nippon, Akzo Nobel, Rustoleum, Nerolac, Asian Paints, ICI paints etc.

Acrylic emulsions are waterborne emulsions of polymers, not restricted to styrene/vinyl based polymers with number average molecular weights 10000 to 1000000. Acrylic emulsions are also supplied ready to use by reputed brands as Nippon, Akzo Nobel, Rustoleum, Nerolac, Asian Paints, ICI paints etc.

In another embodiment of the invention the composition is prepared by mixing metal and/or metal oxide particles (20-80% by weight), metal mixing UV ink (10%-40% by weight) and UV ink (10 to 70% by weight) in a planetary mixer to form a paste.

Metal mixing UV INK is UV curable ink that enhances the binding properties of metal particles to the UV ink that is acrylic oligomer mixture.

When this composition is deposited on the substrate, curing of deposited paste is carried out by UV of suitable light intensity depending on the speed of the moving substrate (sheet/roll) at 0.6 meter/sec to 5 meter/sec.

The acrylic emulsion is an acrylic oligomer mixture that acts as a binding agent for the metal particles to adhere and also to form a firm bond between the substrate preferably but not limited to paper. Further this imparts the flexibility to the deposit so as to impart the crack and crumple resistance The metal mixing UV INK is UV curable ink that enhances the binding of particles to the UV ink which is acrylic oligomer composition.

The polymer composition of uv inks includes but not restricted to the polyester acrylate oligomers, phenoxy ethyl acrylates, Isobornyl acryaltes, polyurethanes, epoxy acrylates, methacrylates, 1,6 hexanediol di acrylates, glycol ether acrylates, photo initiators etc. The number average molecular weight range is but not restricted to 1000 to 100000.

Ready to use uv inks are supplied by reputed UV screen printing ink suppliers as Norcote inc, DIC, Sun chemicals, Siegwerk etc.

UV inks used are commercially available uv inks supplied by reputed UV screen printing ink suppliers as Norcote inc, DIC, Sun chemicals, Siegwerk etc.

It is to be noted that the said compositions can be tailored as per the requirements in terms of viscosity, use of means of deposition/application on the substrate, surface characteristics of the substrate etc.

In one of the embodiments the particulate deposition metal mixing ink composition comprises of polymer mixture in the range of 10-25% by weight; Acrylate mixture in the range of 15 to 44% by weight, 1,6 hexanediol diacrylate in the range 5 to 20% by weight, photoinitiator mixture in the range of 5 to 12% by weight, glycol ether acrylate in the range of 15 to 40% by weight.

The specific gravity of the composition is in the range of 1.0-1.2. The curing condition for this ink composition is in the range of 200-400 Watt/cm.

In another embodiment the particulate deposition of UV ink comprises acrylated oligomer Mixture in the range of 25 to 72% by weight, N-Vinyl-2 Pyrrolidone (NVP) in the range of 10 to 30% by weight, acrylated monomer mixture in the range of 4 to 18% by weight, 2-phenoxyethanol acrylate in the range of 4 to 16% by weight, photo Initiators in the range of 2 to 15% by weight, carbon black in the range of 0.8 to 14% by weight.

The specific gravity of the composition is in the range of 1.0 to 1.6. The curing condition for this ink composition is in the range of 200-400 Watt/cm.

In one of the embodiments the magnetic particles may include a high coercivity material. An exemplary high coercivity material is a neodymium magnet comprising Nd, Fe and B. The magnetic particles may include a ferrimagnetic material, an antiferromagnetic material, a ferromagnetic material or domains of varying magnetic properties within a continuous material (including voids causing variable magnetic properties) and combinations thereof. The ferromagnetic material is selected from the group consisting of MnBi, CrTe, EuO, $CrO_2$, MnAs, Fe, Ni, Co, Gd, Dy, corresponding alloys and oxides of Fe, Ni, Co, Sm, Gd, Dy, and combinations thereof.

The composition is deposited on the substrate using an applicator system comprising screen printing (Flat bed/Rotary screen printing) wherein the screen is preferably of hardened steel having tailored tapered apertures based on the area and amount to be deposited under pressure on the substrate to maintain deposition thickness of 50 to 150 microns wherein the apparent viscosity of the paste is 2 Pas to 10 Pas during the deposition process.

In another embodiment spot dispensing may also be used for the deposition of the composition on the substrate.

When a composition containing water based emulsion is deposited on the substrate, heat curing of the deposited paste is carried out at 50-200° C. as the substrate (sheet/roll) moves at 0.6 meter/sec to 5 meter/sec.

When a composition based on UV curable ink is deposited on the substrate, curing of deposited paste is carried out by UV of suitable light intensity depending upon the speed of movement of substrate as the substrate moves (sheet/roll) at 0.6 meter/sec to 5 meter/sec.

The particle composite depositions on the substrate are magnetized using strong magnetic fields provided for example by Grade 50 Neomax magnets.

Upon completion of the deposition and magnetization the substrate is processed in the said data capture system enables capture and processing of information/data The data processing system comprising a data capturing system to capture, process and transform information/data, wherein the system comprises data capture station comprising readers to capture the unique information/signature from the deposit;

a data-matrix printer to print covert UV ink wherein one or plurality of data-matrix images/barcodes are printed at predetermined locations on the substrate wherein each data matrix barcode has a unique serial number; and Print verifier to capture and verify the barcode/image.

In one of the embodiments the said substrate is currency note. In another embodiment to the substrate is selected from woven or non woven fibre.

The present invention is illustrated with non-limiting examples.

EXAMPLE 1

A paper substrate was used to deposit the composition of the present invention and was tested for deposition robustness, affixation and effects of aging. The substrate was in the form of 600 mm×600 mm sheets. The through put of the system was maintained at 3500 sheets per hour.

The prepared particulate compositions contained particles 50% by weight of metal particles (Nd: 10-20, B: 3-6, Fe: 87-74% by weight of the composition) wherein the particle size distribution was

| Particle size distribution (PSD) | Weight % | Total > 60 Mesh (250 × 250 μm opening) | <2 wt % |
|---|---|---|---|
| | | Total > 80 Mesh (177 × 177 μm opening) | <30 wt % |
| | | Total < 270 Mesh (53 × 53 μm opening) | <15 wt % |

One set of samples were prepared using the above metals were mixed and soaked for 10 minutes with Alkyd enamel which is a solvent based anticorrosion agent with specific gravity 1.0-1.11 (10% by weight of the composition) to which a water based acrylic emulsion with specific gravity 1.38-1.42 (40% by weight of the total composition) was added and mixed using a planetary mixer at (1000 rpm) to form a uniformly distributed paste. Apparent Viscosity of the paste was 6.5 Pas.

A second set of samples were prepared using the above metal mix and blended with 10% by weight of metal mixing ink of specific gravity 1.088 and 40% by weight of white UV ink of specific gravity 1.33 using a planetary mixer at 1000-2000 rpm to form a uniformly distributed paste of apparent viscosity of 3.48 Pas.

The magnetic properties of the pastes were:

| Magnetic properties of the paste | | |
|---|---|---|
| Residual Induction, Br | mT | 915-935 |
| Coercive force, Hcb | kA/m (KOe) | 450 |
| Intrinsic coercively, Hcj | kA/m (KOe) | 540-620 |
| Energy energy, (BH)max | kJ/m$^3$ (MGOe) | 114-126 |

The two pastes were used to prepare set 1 (composition with water based acrylic emulsion) and set 2 test samples (composition based on metal mixing ink and UV ink).

The paste as mixed above was spread on the reciprocating screen (screen moves and squeegee stationary). The screen velocity was maintained at 0.6 to 1.0 meters per sec. The thickness of the paste was maintained between 50-150 micron. An overlay of UV cured ink was printed on top of the paste print and cured under UV light (125 Mj/cm)). Further, Neomax 50 with field strength of 400 kJ/m$^3$ was used for magnetizing the cured paste.

Following tests were carried out on the set 1 and set 2 of prepared samples:
  Measure of affixation—The substrate was tested by using a rub proof tester—for 10000 cycles-3.5 PSI pressure. Magneto optic image of the fingerprint was captured and compared with the stored magneto optic image and the matching results are shown in FIGS. 2.1(a) and 2.1(b) for samples of set1 and FIGS. 3.1(a) and 3.1(a) two samples of set2.
  Laundry test—Test was performed using a 1 L reactor, comprising a mechanical stirrer, a heating mantle, containing 500 mL of water, 2.5 g of industrial laundry powder and 5 g Na$_2$CO$_3$. Three substrates were scanned and the samples were placed in the reactor, stirred and heated for 40 minutes at 95 deg C. Samples are washed using distillated water and dried for 2 hours at 40° C. The Magneto optic image of the fingerprint was captured and compared with the stored magneto optic image and the representative matching results are shown in FIGS. 2.2 for sample of set 1 and FIG. 3.2 for sample of set 2.
  Crumple test—Dry crumpling—Test were performed using a hollow cylinder and a solid rod of the matching diameter. First two notes were scanned. They were then rolled to make 15 mm diameter cylinder and inserted in the fixture. The fixture was closed with the piston and 100 N force was exerted for 5 mins. The notes were removed and scanned. Magneto optic image of the fingerprint was captured and compared with the stored magneto optic image and the representative matching results are shown in FIG. 2.3 for sample of Set 1 and FIG. 3.3 for sample of set 2.
  Wet crumpling the substrate was damped in water for 10 minutes, wiped with a cotton cloth or tissue and then the same crumpling test is repeated as above. Magneto optic image of the fingerprint is captured and compared with the stored magneto optic image and the representative matching results are shown in 2.4 for sample of set 1 and FIG. 3.4 for sample of set 2.
  Accelerated aging test—The substrates/sheets were exposed the temp start from 150 for 1 hr and test for the scan results. Scan results cold still match the original scan results. Magneto optic image of the fingerprint was captured and compared with the stored magneto optic image and the representative matching results are shown in FIG. 2.5 for sample of set 1 and FIG. 3.5 for sample of set 2.

The test methodology for matching the magneto optic image was as follows,
1. Bank note is inserted to the notes reader to obtain the information on the barcode and fingerprint label on the notes.
2. At this time a barcode scanner scans the data matrix barcode while a magneto-optic device will capture cross hair image and magnetic particle image simultaneously.
3. With this information, notes reader communicates with data base server to authenticate the note by comparing with the information on the note with the information that stored during registration.
4. If the information matched, the note is an authentic note.

EXAMPLE 2

A woven cloth is used as a substrate deposit the composition of the present invention and was tested for deposition robustness, affixation and effects of aging. The substrate was in the form of roll of 600 mm width.

The composition of the deposit was maintained same as example 1.

The two pastes were used to prepare set 1 (composition with water based acrylic emulsion) and set 2 test samples (composition based on metal mixing ink and UV ink).

The paste as mixed above was spread on the reciprocating screen (screen moves and squeegee stationary). The screen velocity was maintained at 0.6 to 1.0 meters per sec. The thickness of the paste was maintained between 50-150 micron. An overlay of UV cured ink was printed on top of the paste print and cured under UV light (125 Mj/cm)). Further, Neomax 50 with field strength of 400 kJ/m$^3$ was used for magnetizing the cured paste.

Similar set of tests were carried out for as for example 1 as follows,
  Measure of affixation—The substrate was tested by using a rub proof tester—for 10000 cycles-3.5 PSI pressure. Magneto optic image of the fingerprint was captured and compared with the stored magneto optic image.
  Laundry test—Test was performed using a 1 L reactor, comprising a mechanical stirrer, a heating mantle, containing 500 mL of water, 2.5 g of industrial laundry powder and 5 g Na$_2$CO$_3$. Three substrates were scanned and the samples were placed in the reactor, stirred and heated for 40 minutes at 95 deg C. Samples are washed using distillated water and dried for 2 hours at 40° C. The Magneto optic image of the fingerprint was captured and compared with the stored magneto optic image.
  Crumple test—Dry crumpling—Test were performed using a hollow cylinder and a solid rod of the matching diameter. First two cloth pieces with the deposition were scanned. They were then rolled to make 15 mm diameter cylinder and inserted in the fixture. The fixture was closed with the piston and 100 N force was exerted for 5 mins. The notes were removed and scanned. Magneto optic image of the fingerprint was captured and compared with the stored magneto optic image Wet crumpling—the substrate was damped in water for 10 minutes, wiped with a cotton cloth or tissue and then the same crumpling test is repeated as above. Magneto optic image of the fingerprint is captured and compared with the stored magneto optic image Accelerated aging test—The substrates were exposed the temp 125 deg C. for 1 hr and test for the scan results (Temperature for the woven cloth should be decided after exposing the substrate first so that the substrate should not blacken or burn). Scan results cold still match the Original scan results. Magneto optic image of the fingerprint was captured and compared with the stored magneto optic image The test methodology for matching the magneto optic image was as follows, 1. Substrate piece with deposition is scanned using a handheld scanner device TX31 and the data is stored in database before starting the test.
2. At this time a barcode scanner scans the data matrix barcode while a magneto-optic device will capture cross hair image and magnetic particle image.
3. With this information, reader communicates with data base server to authenticate by comparing with the information on the substrate with the information that stored during registration.
4. Same scanning test is done after the tests mentioned as above.
5. If the information matched, the substrate piece is an authentic piece.

EXAMPLE 3

A plastic film, white polyester 50 micron thickness, is used as a substrate deposit the composition of the present invention and was tested for deposition robustness, affixation and effects of aging. The substrate was in the form of roll of 600 mm width. The composition of the deposit was maintained same as example 1.

The two pastes were used to prepare set 1 (composition with water based acrylic emulsion) and set 2 test samples (composition based on metal mixing ink and UV ink).

The paste as mixed above was spread on the reciprocating screen (screen moves and squeegee stationary). The screen velocity was maintained at 0.6 to 1.0 meters per sec. The thickness of the paste was maintained between 50-150 micron. An overlay of UV cured ink was printed on top of the paste print and cured under UV light (125 Mj/cm)). Further, Neomax 50 with field strength of 400 kJ/m$^3$ was used for magnetizing the cured paste.

Similar set of tests were carried out for as for example 1 as follows,

Measure of affixation—The substrate was tested by using a rub proof tester—for 10000 cycles-3.5 PSI pressure. Magneto optic image of the fingerprint was captured and compared with the stored magneto optic image.

Laundry test—Test was performed using a 1 L reactor, comprising a mechanical stirrer, a heating mantle, containing 500 mL of water, 2.5 g of industrial laundry powder and 5 g Na$_2$CO$_3$. Three substrates were scanned and the samples were placed in the reactor, stirred and heated for 40 minutes at 95 deg C. Samples are washed using distillated water and dried for 2 hours at 40° C. The Magneto optic image of the fingerprint was captured and compared with the stored magneto optic image.

Crumple test—Dry crumpling—Test were performed using a hollow cylinder and a solid rod of the matching diameter. First two cloth pieces with the deposition were scanned. They were then rolled to make 15 mm diameter cylinder and inserted in the fixture. The fixture was closed with the piston and 100 N force was exerted for 5 mins. The notes were removed and scanned. Magneto optic image of the fingerprint was captured and compared with the stored magneto optic image Wet crumpling—the substrate was damped in water for 10 minutes, wiped with a cotton cloth or tissue and then the same crumpling test is repeated as above. Magneto optic image of the fingerprint is captured and compared with the stored magneto optic image Accelerated aging test—The substrates were exposed the temp 125 deg C. for 1 hr and test for the scan results (Temperature for the woven cloth should be decided after exposing the substrate first so that the substrate should not blacken or burn). Scan results cold still match the original scan results. Magneto optic image of the fingerprint was captured and compared with the stored magneto optic image The test methodology for matching the magneto optic image was as follows, 1. Substrate piece with deposition is scanned using a handheld scanner device TX31 and the data is stored in database before starting the test.
2. At this time a barcode scanner scans the data matrix barcode while a magneto-optic device will capture cross hair image and magnetic particle image.
3. With this information, reader communicates with data base server to authenticate by comparing with the information on the substrate with the information that stored during registration.
4. Same scanning test is done after the tests mentioned as above.
5. If the information matched, the substrate piece is an authentic piece.

EXAMPLE 4

A plastic film, white polyester 50 micron thickness, is used as a substrate deposit the composition of the present invention and was tested for deposition robustness, affixation and effects of aging. The substrate was in the form of roll of 600 mm width.

The composition of the deposit was maintained same as example 1.

The two pastes were used to prepare set 1 (composition with water based acrylic emulsion) and set 2 test samples (composition based on metal mixing ink and UV ink). The different deposition method is used using a gravure printing technology.

The paste as mixed above was taken in a tray below the gravure roller of 50-150 lines per inch with a design of the deposition required, engraved on the roller at required positions. The speed of the roller is maintained at 0.6 to 1.0 meters per sec. The thickness of the deposited paste was maintained between 50-150 micron. An overlay of UV cured ink was printed on top of the paste print and cured under UV light (125 Mj/cm)). Further, Neomax 50 with field strength of 400 kJ/m$^3$ was used for magnetizing the cured paste.

Similar set of tests were carried out for as for example 1 as follows,

Measure of affixation—The substrate was tested by using a rub proof tester—for 10000 cycles—3.5 PSI pressure. Magneto optic image of the fingerprint was captured and compared with the stored magneto optic image.

Laundry test—Test was performed using a 1 L reactor, comprising a mechanical stirrer, a heating mantle, containing 500 mL of water, 2.5 g of industrial laundry powder and 5 g $Na_2CO_3$. Three substrates were scanned and the samples were placed in the reactor, stirred and heated for 40 minutes at 95 deg C. Samples are washed using distillated water and dried for 2 hours at 40° C. The Magneto optic image of the fingerprint was captured and compared with the stored magneto optic image.

Crumple test—Dry crumpling—Test were performed using a hollow cylinder and a solid rod of the matching diameter. First two cloth pieces with the deposition were scanned. They were then rolled to make 15 mm diameter cylinder and inserted in the fixture. The fixture was closed with the piston and 100 N force was exerted for 5 mins. The notes were removed and scanned. Magneto optic image of the fingerprint was captured and compared with the stored magneto optic image Wet crumpling—the substrate was damped in water for 10 minutes, wiped with a cotton cloth or tissue and then the same crumpling test is repeated as above. Magneto optic image of the fingerprint is captured and compared with the stored magneto optic image Accelerated aging test—The substrates were exposed the temp 125 deg C. for 1 hr and test for the scan results (Temperature for the woven cloth should be decided after exposing the substrate first so that the substrate should not blacken or burn). Scan results cold still match the original scan results. Magneto optic image of the fingerprint was captured and compared with the stored magneto optic image The test methodology for matching the magneto optic image was as follows, 1. Substrate piece with deposition is scanned using a handheld scanner device TX31 and the data is stored in database before starting the test.
2. At this time a barcode scanner scans the data matrix barcode while a magneto-optic device will capture cross hair image and magnetic particle image.
3. With this information, reader communicates with data base server to authenticate by comparing with the information on the substrate with the information that stored during registration.
4. Same scanning test is done after the tests mentioned as above.
5. If the information matched, the substrate piece is an authentic piece.

It is evident from the present invention that the particulate composition of the present invention synergistically combined with the said applicator and data capture system enables deposition/application of the formulation/composition on the substrate on a mass scale yet maintaining precision of location of the identifier on the substrate, application of the identifier with respect to velocity of the substrate during production process, drying the deposited formulation in predetermined time and ensuring robustness of the deposited formulation during handling of the object and further enabling capturing digital signal of the deposited composition on the said substrate, store and embed the same in encrypted format to be further printed on the substrate as an associated identifier so as to create a dedicated, non repeatable unique functional digitised relation between the associated identifiers for specific object.

We claim:

1. A system comprising:
a document comprising (a) a substrate comprising a particulate composition provided as a particulate deposit identifier; and (b) a barcode or image or combination thereof provided as an associated identifier,
wherein there is an unique functional relation between the particulate deposit identifier and the associated identifier,
further comprising a substrate preparation system for preparation and functionalization of said substrate, the substrate preparation system comprising an applicator and a data capture system,
wherein the applicator comprises a device to magnetize the particulate composition on the substrate,
wherein the data capture system comprises a data capture center comprising a magneto-optic reading system, a data-matrix printing station, and a print verification station,
wherein said magneto-optic reading system captures a signal from said particulate composition identifier and transforms the signal into a magneto-optical image to assign a signature to said particulate composition,
wherein said signature is embedded in the barcode or image or combination thereof for irrefutably linking said signature with the associated identifier.

2. The system as claimed in claim 1, wherein the document comprises a security document or a currency and wherein the substrate comprises woven or non-woven fiber.

3. The system as claimed in claim 1, wherein said applicator comprises spot dispensing, flat bed screen printing, flat bed screen printing, rotary screen printing or combinations thereof.

4. The system as claimed in claim 1, wherein further comprising a drying station for curing a deposited paste either by heat curing or by UV curing.

5. The system as claimed in claim 1, wherein a process to assign the signature to the particulate based composition comprises:
creating reference coordinate system during printing process of substrate by printing fiducial marks on top of the applied particulate based composition identifier so that an origin and orientation can be determined from the fiducial marks;
capturing magneto-optical image from the particulate based composition with the aid of said magneto-optic reading system;
dividing said image into multiple regions using the fiducial marks as a coordinate system;
checking said regions for magnetic field strength variation for explicit signature creation;
storing magneto-optical image in said data capture system database as its full reference signature for particular substrate;
creating a partial magneto-optical reference signature;
encryption of said partial reference signature using AES 128 for symmetric key encryption, or by using the public or private key or the combination thereof pair if asymmetric encryption is preferable;
compressing and encoding said partial reference signature into a barcode that is printed on the substrate;
wherein by reconstructing the partial reference signature from the barcode printed on the substrate and matching against a newly acquired magneto-optical signature, a reading system associated with the present determines whether the two match or correlate without using the full reference signature stored in the system database; and reading the particulate based composition using magneto optic reading system and the barcode after printing for verification purposes using a reading system of the print verification station so as to match the newly captured partial signature against the partial reference signature reconstructed from the barcode during the substrate printing process.

6. The system as claimed in claim 5, wherein fiducial marks comprise: a cross-hair, square, rectangular, circular or linear marks or any combination of the above.

7. The system as claimed in claim 1, wherein the said magneto optic reading system operates to capture and develop a digital representation at a rate in a range of 100 to 300 millisecond per deposit;
   said digital representation is embedded in an encrypted format into the barcode or image or combination thereof at the rate in the range of 100-300 milliseconds per digital representation
   wherein said barcode or image or combination thereof is printed onto substrate for irrefutably linking both the particle deposit identifier and its digital representation embedded onto the substrate in the form of the barcode or image or combination thereof.

8. The system as claimed in claim 1, wherein said magneto-optic reading system and the reading system to be used in the field reads, decodes and correlates partial magneto-optical reference signatures which are encoded in a barcode printed on the substrate itself
   wherein matching with the partial reference signature is first carried out, and matching with the full reference signature is only required if the system cannot reliably determine authenticity from the partial reference signature.

9. The system as claimed in claim 1, wherein a process to operate said magneto-optic reading system comprises:
   decoding of the barcode printed on the substrate;
   reconstructing partial reference signature from the said decoded barcode;
   detecting said fiducial marks on the particulate based composition and capturing a new magneto-optical signature from said particulate based composition;
   extracting another partial signature from the newly acquired signature by using the selected region information encoded in the barcode;
   matching the partial reference signature reconstructed from the barcode and the partial signature extracted from the newly acquired signature;
   deciding of authenticity based on the extent of said matching; and
   optionally if the two partial signatures match cannot be reliably determined, retrieving the full reference signature from the database using the substrate serial number or other identifying information, and then matching the full reference signature from the database against the newly acquired full signature to determine whether the substrate is authenticated or fails.

10. The system as claimed in claim 1, wherein said reading system comprises a barcode scanner and a signature reader.

11. The system as claimed in claim 1, wherein said reading system comprises a barcode scanner to read barcode on the substrate and a signature reader to read the particulate based composition on the substrate at a time manually wherein the signature reader comprises a handheld reader.

12. The system as claimed in claim 1, wherein said particulate composition comprises of magnetizable metal or metal oxide particles, alkyd resins, water based acrylic emulsion, UV curable ink or combinations thereof.

13. The system as claimed in claim 12, wherein the water based acrylic emulsion and the UV curable ink comprise of binders, viscosity modifiers and stabilizers, drying agents to ensure rapid drying and speedy surface skin formation after the composition is pressured deposited onto the substrate.

14. The system as claimed in claim 12, the particulate composition further comprising an enamel.

15. The system as claimed in claim 14, wherein the enamel comprises an alkydresin, epoxy, polyurethane, acrylic or combinations thereof.

16. The system as claimed in claim 12, wherein the water based acrylic emulsion is deposited on the substrate as a paste, the deposited paste is heat cured at 50-200° C. as the substrate moves with a velocity in a range of 0.6 meter/sec to 5 meter/sec.

17. The system as claimed in claim 12, wherein the UV curable ink is deposited on the substrate as a paste that is UV cured, and the substrate is displaced at a velocity in a range of 0.6 meter/sec to 5 meter/sec.

18. The system as claimed in claim 1, wherein said particulate composition comprises metal or metal oxide particles and UV curable ink.

19. The system as claimed in claim 1, wherein said particulate composition is in a form of paste with apparent viscosity in the range of 2 to 10 Pas having a solid content in a range of 50-90%.

20. The system as claimed in claim 1, wherein said particulate composition is prepared and applied on the substrate by a process comprising:
   soaking metal particles/metal oxide in the range of 20 to 80% by weight in Enamel in the range of 10%-50% by weight to impart the rust proof features, wherein the alkyd resin has specific gravity 1-2.0 preferably 1.0-1.11,
   adding acrylic emulsion in the range of 10 to 70% by weight and mixing in a planetary mixer to form a paste wherein the acrylic emulsion has specific gravity of 1.2-2.0 preferably 1.38-1.42,
   depositing the composition on the substrate, and
   heat curing of the deposited composition at 50-200° C. as the substrate moves with the velocity in the range of 0.6 meter/sec to 5 meter/sec.

21. The system as claimed in claim 1, wherein the alkyd resin comprises soybean oil modified alkyds, long oil modified alkyds with the number average molecular weights of 2000 to 10000 or combinations thereof and the acrylic comprises an acrylic emulsion that is a waterborne emulsion of polymers, not restricted to styrene/vinyl based polymers with number average molecular weights 10000 to 1000000.

22. The system as claimed in claim 19, wherein the acrylic emulsion is an acrylic oligomer mixture that acts as a binding agent for the metal particles to adhere and also to form a firm bond between the substrate.

23. The system as claimed in claim 22, wherein the UV curable ink enhances the binding of the metal particles.

24. The system as claimed in claim 1, wherein said particulate composition is prepared applied on the substrate by a process comprising:
   mixing metal or metal oxide particles or a combination thereof in the range of 20-80% by weight, metal mixing UV ink in the range of 10%-40% by weight and UV ink in the range 10 to 70% by weight in a planetary mixer to form a paste;
   metal mixing UV INK is UV curable ink that enhances the binding properties of metal particles to the UV ink that is acrylic oligomer mixture
   depositing the composition on the substrate; and curing of deposited paste by UV wherein substrate is moved at the velocity of the range of 0.6 meter/sec to 5 meter/sec.

25. The system as claimed in claim 1, wherein the particulate composition comprise magnetic particles.

26. The system as claimed in claim 25, wherein the magnetic particles include a ferrimagnetic material, an antiferromagnetic material, a ferromagnetic material or domains of varying magnetic properties within a continuous material and combinations thereof
   wherein the ferromagnetic material is selected from the group consisting of MnBi, CrTe, EuO, CrO2, MnAs, Fe, Ni, Co, Gd, Dy, corresponding alloys and oxides of Fe, Ni, Co, Sm, Gd, Dy, and combinations thereof.

27. The system as claimed in claim 1, wherein said particulate composition is deposited on the substrate using the applicator comprises a screen printing device comprising a screen of hardened steel having tailored tapered apertures based on the area and amount of the particulate composition to be deposited under pressure on the substrate to maintain deposition thickness in a range of 50 to 150 microns wherein an apparent viscosity of a paste comprising the particulate composition is 2 Pa·s to 10 Pa·s during deposition.

28. The system as claimed in claim 27, wherein spot dispensing is used for the deposition of said paste on the substrate.

29. The system as claimed in claim 1, wherein the particle composite is magnetized using magnetic fields generated by Grade 50 Neomax magnets.

30. A substrate preparation system comprising an applicator and a data capture system,
   wherein the applicator comprises a device to magnetize a particulate composition provided as a particulate deposit identifier on the substrate,
   wherein the data capture system comprises a data capture center comprising a magneto-optic reading system, a data-matrix printing station, and a print verification station,
   wherein said magneto-optic reading system captures a signal from the particulate composition identifier and transforms the signal into a magneto-optical image to assign a signature to said particulate composition,
   wherein said signature is embedded in the barcode or image or combination thereof for irrefutably linking said signature with an associated identifier associated to a barcode or image or combination thereof.

* * * * *